(12) United States Patent
Bell, Jr. et al.

(10) Patent No.: US 8,379,847 B2
(45) Date of Patent: Feb. 19, 2013

(54) DATA AND CONTROL ENCRYPTION

(75) Inventors: Robert H. Bell, Jr., Austin, TX (US); Louis Bennie Capps, Jr., Georgetown, TX (US); Michael Jay Shapiro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 12/828,080

(22) Filed: Jun. 30, 2010

(65) Prior Publication Data

US 2012/0002812 A1  Jan. 5, 2012

(51) Int. Cl.
*H04L 9/00* (2006.01)
*H04L 9/32* (2006.01)

(52) U.S. Cl. .............. 380/44; 380/46; 713/189

(58) Field of Classification Search ............... 380/28, 380/239, 262–265, 268, 270, 277, 44, 46; 713/189
See application file for complete search history.

(56) References Cited

U.S. PATENT DOCUMENTS

| | | | |
|---|---|---|---|
| 4,905,176 A | | 2/1990 | Schulz |
| 5,818,934 A | * | 10/1998 | Cuccia ............... 380/216 |
| 6,108,421 A | * | 8/2000 | Kurdziel et al. .......... 380/28 |
| 6,304,657 B1 | * | 10/2001 | Yokota et al. ........... 380/28 |
| 6,327,661 B1 | | 12/2001 | Kocher et al. |
| 6,577,732 B1 | | 6/2003 | Kartalopoulos |
| 6,865,695 B2 | | 3/2005 | Joyner et al. |
| 6,920,562 B1 | | 7/2005 | Kerr et al. |
| 6,948,070 B1 | | 9/2005 | Ginter et al. |
| 7,130,425 B2 | | 10/2006 | Strasser et al. |
| 7,248,696 B2 | | 7/2007 | Craft et al. |
| 2002/0169968 A1 | | 11/2002 | Gammel et al. |

OTHER PUBLICATIONS

Urien et al., "Security and privacy for the next wireless generation", International Journal of Network Management, 2008, pp. 129-145.
Platte et al., "A Combined Hardware and Software Architecture for Secure Computing", CF'05 May 2005, Ischia Italy, ACM, pp. 280-289.
Kujoth et al., "A Reconfigurable Unit for a Clustered Programmable-Reconfigurable Precessor", FPGA'04, Feb. 2004 Monterey CA, ACM, pp. 200-210.

* cited by examiner

*Primary Examiner* — Hosuk Song
(74) *Attorney, Agent, or Firm* — Yee & Associates, P.C.; Matthew B. Talpis

(57) ABSTRACT

Secure communication of data between devices includes encrypting unencrypted data at a first device by reordering unencrypted bits provided in parallel on a device bus, including data and control bits, from an unencrypted order to form encrypted data including a plurality of encrypted bits in parallel in an encrypted order defined by a key. The encrypted data may be transmitted to another device where the encrypted data is decrypted by using the key to order the encrypted bits to restore the unencrypted order thereby to reform the unencrypted data.

18 Claims, 5 Drawing Sheets

DATA AND CONTROL ENCRYPTION

BACKGROUND

1. Field

The disclosure relates generally to secure communication of data between systems and, more specifically, to systems and methods for the encryption of data communicated or transferred between systems and devices.

2. Description of the Related Art

Secure communication of data between computer systems is important in data processing environments to prevent access to such data by those who are not authorized to view it. It is often difficult to physically secure all access to computer systems and networks, and there have been reports of data in transit between computer systems being intercepted. Therefore, data encryption often is used to provide security for data in transit, such as data being transferred via computer networks, mobile telephones, wireless microphones, wireless intercom systems, automatic teller machines, and the like.

In general, encryption is the process of transforming information data using an algorithm to make it unreadable to anyone except those possessing special knowledge, usually referred to as a key. The result of the encryption process is encrypted information or data. Encrypted data can be transmitted between systems and devices and, if intercepted in transit, will not be readable by anyone that does not possess the required key. The required key must be possessed, however, by the receiving system or device to which the encrypted data is intentionally transmitted. The receiving system or device uses the key to decrypt the encrypted data or information to make the encrypted information readable again, that is, to make it unencrypted. Various standards and cryptographic software and hardware to encrypt data for transmission between computer systems and other devices are widely available.

Digital information to be communicated between computer systems and other devices typically is formatted to include both information data, the data itself, and control data that is used, for example, for controlling the communication of the data between systems and devices. In a typical known data encryption method, data is encrypted and sent over wires to one or more receiving systems where it is decrypted. In most cases, only the information content portion of the data is encrypted for transmission. The control data typically is not encrypted, and thus is intact, unencrypted, and open to attack during transit. Knowledge of control flow may be deduced from the unencrypted control data if the transmission is intercepted. Such knowledge may include knowledge of the start and end of the data separate from the control flow. However, since the data itself is encrypted, it is assumed that this knowledge of the control flow is harmless.

SUMMARY

According to one illustrative embodiment, unencrypted data is received or generated and provided on a device bus at a first device. The device bus includes a plurality of wires defining a plurality of unencrypted bit positions. The unencrypted data includes a plurality of unencrypted bits. Each of the unencrypted bits is provided on one of the plurality of wires of the device bus in parallel in an unencrypted order. The first device reorders the unencrypted bits in the unencrypted data to form encrypted data, wherein the encrypted data includes a plurality of encrypted bits in parallel in an encrypted order defined by a key. The encrypted data then may be transmitted from the first device to a second device.

A device in accordance with an illustrative embodiment includes a device bus including a plurality of wires defining a plurality of unencrypted bit positions. A multiplexer is coupled to the device bus and adapted to reorder a plurality of unencrypted bits in unencrypted data provided on the bus to form encrypted data including a plurality of encrypted bits in parallel in an encrypted order defined by a first key. Each of the unencrypted bits is provided on one of the first plurality of wires in an unencrypted order. The device further may include a transmitter adapted to transmit the encrypted data to a second device.

A computer program product includes a computer readable storage medium having stored thereon computer program instructions for controlling a data processing system. The computer program instructions stored on the computer readable storage medium include computer program instructions for controlling the data processing system to generate control signals to reorder a plurality of unencrypted bits provided in parallel in an unencrypted order forming unencrypted data using a first key to form encrypted data including a plurality of encrypted bits in parallel in an encrypted order defined by the first key, and computer program instructions for controlling the data processing system to control transmission of the encrypted data.

In accordance with an illustrative embodiment, the unencrypted data includes both data bits and control bits. In this case, reordering the unencrypted bits in the unencrypted data includes interchanging the positions of data bits and control bits to form the encrypted data.

Further objects, features, and advantages will be apparent from the following detailed description and with reference to the accompanying drawings.

DETAILED DESCRIPTION

Figure 1:
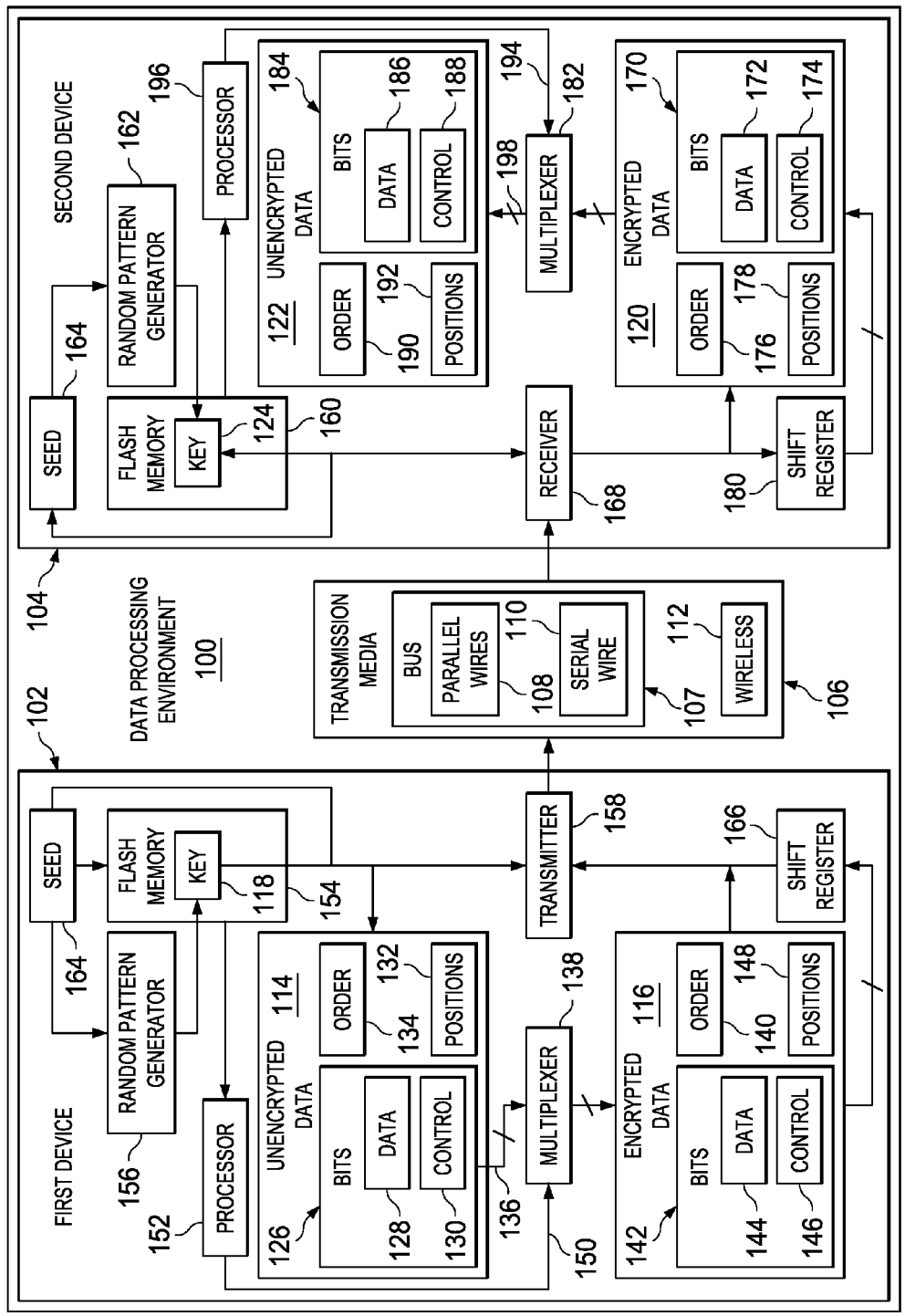
FIG. 1 is a functional block diagram of data and control encryption implemented in a data processing environment in accordance with an illustrative embodiment.

The different illustrative embodiments recognize and take into account a number of different considerations. For example, the different illustrative embodiments recognize and take into account that, with the advent of more powerful computing capability, depending on the encryption technology, data may be less secure. In particular, the use of encryption methods that permit a complete separation during transmission of the control flow, which is not encrypted, and of the data, which is encrypted, may lead to intrusions and loss of data security. Therefore, the different illustrative embodiments recognize that what is needed is another level of security in which the actual meanings of the signals used to communicate information in a transmission medium are jumbled, such that the control and data signals themselves change over time, and in which the signals can be efficiently and exactly unjumbled by the intended receiver. In this way, both control signals and data signals are encrypted, rather than simply encrypting the data.

A method and apparatus for secure communication of data between and among computer systems and other devices in which both control signals and data signals are encrypted is disclosed. A method and apparatus in accordance with an illustrative embodiment includes reordering unencrypted data, including unencrypted bits in an unencrypted order, to form encrypted data. The encrypted data includes a plurality of encrypted bits in an encrypted order defined by a key. The encrypted data then may be transmitted securely.

A data processing environment in which a method and apparatus in accordance with an illustrative embodiment may be implemented is illustrated in, and will be described with reference to, FIG. 1. Data processing environment 100 in accordance with an illustrative embodiment includes at least first device 102 and second device 104. First device 102 and second device 104 may be any device or machine that is capable of sending, receiving, generating, storing, and/or manipulating digital information or data. For example, without limitation, first device 102 and second device 104 may include computer systems of various types, including personal computers or portable computing devices. In these illustrative examples, personal computers may take the form of desktop computers, laptop computers, servers, workstations, and computer terminals. In these illustrative examples, portable computing devices may take the form of tablet computers or personal digital assistants.

First device 102 and second device 104 may also include various components of or peripheral devices associated with computer systems that are capable of receiving digital data, such as printers, communication devices, such as modems and facsimile machines, and memory devices, including removable storage devices such as portable flash drive memory devices. Devices 102 and 104 may also include devices for transmitting and receiving information in digital form that are primarily personal communication devices. Personal communication devices may be, for example, cellular or other digital telephones and other devices that send and receive data using cellular or other wireless network communications protocols and systems.

First device 102 and second device 104 may be the same type or kind of device. Alternatively, first device 102 and second device 104 may be different types or kinds of devices, as mentioned above. Although only first device 102 and second device 104 are illustrated in FIG. 1, data processing environment 100 in which data and control encryption in accordance with an illustrative embodiment is implemented may include a plurality of devices, between which encrypted data may be communicated in the manner disclosed herein. Such a plurality of devices in data processing environment 100 in accordance with an illustrative embodiment may include various devices of the same type and/or various devices of different types.

Data is transmitted between first device 102 and second device 104 via transmission media 106. Transmission media 106 may include various media or combinations of media that are currently used or that are used in the future to carry digital data between any of the various types of devices described above. For example, transmission media 106 may include bus 107. Bus 107 may be a parallel bus including a plurality of parallel wires 108 over which bits of digital data are transmitted simultaneously in parallel. Alternatively, bus 107 may be a serial bus, including serial wire 110 over which bits of digital data are transmitted one after the other in series. As another alternative, transmission media 106 may include various wireless transmission media 112. Wireless transmission media 112 may include, for example, radio frequency wireless communications or wireless communications using other frequencies or media such as microwave, optical, or sonic wireless communications.

Transmission media 106 also may include various combinations of communication media. For example, bus 107 may include a plurality of parallel wires 108 connecting first device 102 to second device 104 and wherein one or more of parallel wires 108 is used as serial wire 110 for serial transmission of data bits between first device 102 and second device 104.

Transmission media 106 may be used to implement bus 107 for connecting first device 102 to second device 104 as well as for connecting first device 102 and second device 104 to any other devices in data processing environment 100 to form a system or network of such devices. Bus 107 may include known bus structures and wired or wireless networks using various known bus or network communications protocols to control communications via transmission media 106. For example, bus 107 may include a system bus providing an internal communication channel among devices 102 and 104 and other devices forming the internal components of a computer system. Data and control encryption in accordance with an illustrative embodiment may be used in combination with any such bus or network protocol that is currently in use or that may be used in the future to control communication between first device 102 and second device 104 via transmission media 106.

First device 102 includes unencrypted data 114 that is to be transmitted securely to second device 104. In accordance with an illustrative embodiment, data is encrypted at first device 102 and transmitted in encrypted form in a secure manner to second device 104 where the data is decrypted by second device 104. In accordance with an illustrative embodiment, unencrypted data 114 is transformed by first device 102 into encrypted data 116 using key 118 stored on first device 102. As will be described in more detail below, in accordance with an illustrative embodiment, data is encrypted in a manner in which both data and control information may be encrypted by reordering the bits to be transmitted into an encrypted order defined by key 118. Encrypted data 116 is then transmitted, via transmission media 106, to second device 104 where it is stored as received encrypted data 120 by second device 104. At second device 104, received encrypted data 120 is decrypted to reform unencrypted data 122 using key 124 stored on second device 104. Key 124 is the same as key 118 used to encrypt the data by first device 102.

Unencrypted data 114 may be initially received or generated by first device 102 in any manner. For example, unencrypted data 114 may be received by first device 102 from another device or may be generated by first device 102. In either case, unencrypted data 114 is said to be received by first device 102.

Unencrypted data 114 may be stored in any appropriate manner on first device 102 or in a manner so as to be accessible by first device 102. For example, unencrypted data 114 may be stored in memory provided on, connected to, or otherwise accessible by first device 102 or any component of first device 102.

Unencrypted data 114 may be in any format in which digital data is stored and/or communicated. For example, unencrypted data 114 includes unencrypted bits 126, which may include information or data bits 128 as well as one or more control bits 130. Data bits 128 contain the information content of unencrypted data 114. Control bits 130 may be used in various ways, for example, for the transmission and processing of unencrypted data 114.

Unencrypted bits 126 typically are grouped into groups of bits wherein each group includes a number of bit positions 132. Such groups may variously be referred to as bytes or words or by some other terminology. Such groups may include any number of bit positions 132 into which unencrypted bits 126, including data bits 128 and control bits 130, are positioned in order 134. Thus, in accordance with an illustrative embodiment, unencrypted data 114 includes unencrypted bits 126 placed in unencrypted order 134 in an available number of bit positions 132.

In accordance with an illustrative embodiment, unencrypted data 114 may be provided for encryption by first device 102 on device bus 136. Device bus 136 may be a parallel bus including a number of parallel wires corresponding to the number of bit positions 132. In this case, each data bit 128 and control bit 130 in unencrypted data 114 is provided on one of the wires of device bus 136 in parallel in unencrypted order 134. As will be discussed in more detail below, device bus 136 may include more wires than required for the total number of data 128 and control 130 bits in the unencrypted data 114. These excess wires in device bus 136 may be spare wires corresponding to spare bit positions 132 on which neither data bits 128 nor control bits 130 are provided for encryption.

In accordance with an illustrative embodiment, unencrypted data 114 is transformed into encrypted data 116 for transmission by operation of multiplexer 138. As will be described in more detail below, multiplexer 138 operates to reorder unencrypted bits 126 of unencrypted data 114 provided on device bus 136 into encrypted order 140 using key 118 to form encrypted data 116. Encrypted data 116 thus includes encrypted bits 142, which may include data bits 144 and control bits 146, in encrypted order 140 in a number of available encrypted bit positions 148. Encrypted order 140 of encrypted bits 142 in encrypted data 116 is different from unencrypted order 134 of unencrypted bits 126 in unencrypted data 114.

Encrypted data 116 may be stored in any appropriate manner on first device 102 or in a manner so as to be accessible by first device 102. For example, encrypted data 116 may be stored in memory provided on, connected to, or otherwise accessible by first device 102 or any component of first device 102.

For purposes of the present application, including in the claims, the term "multiplexer" is used to refer to a multiplexer or to a demultiplexer or to any device or structure for providing multiplexing or demultiplexing. In accordance with an illustrative embodiment, multiplexer 138 is connected and controlled so as to copy a bit value in each one of bit positions 132 in unencrypted data 114 into a selected one of bit positions 148 in encrypted data 116, thereby changing the order of the bit values from unencrypted order 134 to encrypted order 140. In short, this function is referred to herein as reordering unencrypted bits 126 in unencrypted data 114 from unencrypted order 134 to encrypted order 140 to form encrypted bits 142 in encrypted data 116.

Multiplexer 138 preferably may be implemented as one or more hardware multiplexer devices. In this case, control signals 150 may be provided from processor 152 to control multiplexer 138 to reorder unencrypted bits 126 in unencrypted order 134 forming unencrypted data 114 to a selected encrypted order 140 to form encrypted data 116. In accordance with an illustrative embodiment, encrypted order 140 into which encrypted bits 142 are placed to form encrypted data is defined by key 118.

Multiplexer 138 is implemented such that each unencrypted data bit value may be multiplexed into one of two or more bit positions 148 in encrypted data 116 to produce encrypted bits 142 in encrypted order 140. In one embodiment, each of unencrypted bits 126 may be multiplexed into any bit positions 148 in encrypted data 116. However, to minimize delay through multiplexer 138, each unencrypted bit 126 may be multiplexed onto any of a smaller subset of bit positions 148 in encrypted data 116. For example, to guarantee only one cycle of multiplexing delay, only four or eight of unencrypted bits 126 may be multiplexed into any one of data bit positions in encrypted data 116, even though there may be more than eight total available bit positions 148 in encrypted data 116.

Processor 152 may be implemented, for example, as any data processing system or data processing device adapted for running program instructions, such as a data processing system or device including a programmable device, such as a microprocessor or similar device. In accordance with an illustrative embodiment, processor 152 is adapted to run a computer program or other instructions for generating the appropriate control signals 150 for controlling multiplexer 138 to produce encrypted data 116 in encrypted order 140 using key 118. For example, a computer program or other instructions used by processor 152 may be stored on first device 102 in memory associated with or accessible by processor 152, such as in read only memory or flash memory 154 on first device 102.

Key 118 preferably is stored on first device 102 in a manner so that key 118 is not lost if power to first device 102 is lost, interrupted or otherwise turned off. For example, key 118 preferably may be stored in flash memory 154 on first device 102.

Key 118 may be a random number or value or pattern that thus defines a random encryption pattern. For example, key 118 may be generated by random pattern generator 156 provided on first device 102. Random pattern generator 156 may be implemented using program instructions stored on first device 102 and that are run on processor 152 to implement a random pattern generator function to generate key 118. Alternatively, random pattern generator 156 may be implemented on first device 102 in hardware or using a programmable device or other structure separate from processor 152.

Where key 118 is generated by first device 102, such as using random pattern generator 156, key 118 must be transmitted from first device 102 to second device 104, as well as to any other devices in data processing environment 100 to which data that is encrypted using key 118 is to be sent. For example, upon initialization of communication with second device 104, first device 102 may transmit key 118 to second device 104, and any other devices in data processing environment 100, via transmission media 106 using transmitter 158. Transmitted key 118 is received by second device 104 and stored on second device 104 as key 124. Key 124 preferably is stored on second device 104 in a manner so that key 124 is not lost if power to second device 104 is lost, interrupted or otherwise turned off. For example, key 124 preferably may be stored in flash memory 160 on second device 104.

In the initial transmission of key 118 to second device 104 key 118 is, of necessity, unencrypted in the manner disclosed herein. As will be discussed in more detail below, periodically a new key 118 may be generated by first device 102, such as using random pattern generator 156. These periodically generated new keys also are transmitted to second device 104, and to any other devices in data processing environment 100, if desired. After the initial transmission of key 118, however, subsequent new keys 118 preferably are encrypted in a manner in accordance with an illustrative embodiment as disclosed herein before being transmitted. Therefore, such new keys to be encrypted may be presented as unencrypted data 114 on device bus 136 to be transformed into encrypted data 116 in the manner described before being transmitted by transmitter 158.

In an alternative embodiment, key 124 may be generated by second device 104, such as using random pattern generator 162 on second device 104. In this case, second device 104 transmits key 124 to first device 102 which is saved as key 118 by first device 102. In another alternative embodiment, keys 118 and 124 may be generated by another device on or external to data processing environment 100. In this case, keys 118 and 124 are received from the other device and saved by first device 102 and second device 104, respectively.

As an alternative to transmitting keys between first device 102 and second device 104, each device may generate its own keys 118 and 124 periodically using seed 164. For example, seed 164 for random pattern generators 156 and 162 in first device 102 and second device 104 may be a number or value that is communicated to first device 102 and second device 104. Seed 164 may be generated in one device, first device 102 or second device 104, and transmitted to the other, or may be generated by another device that is part of or external to data processing environment 100 and transmitted to both devices, first device 102 and second device 104. Seed 164 is used in identical random pattern generators 156 and 162 to generate keys 118 and 124 having the same key values on first device 102 and second device 104 simultaneously.

Encrypted data 116 is transmitted from first device 102 to second device 104 using transmitter 158. Transmitter 158 is implemented in any manner and by using any device or combination of devices appropriate for transmitting encrypted data 116 from first device 102 to second device 104 via one or more transmission media 106.

In cases where transmitter 158 is used to transmit encrypted data 116 in parallel, such as via parallel wires 108 on bus 107, encrypted data bits 142 may be placed on parallel wires 108 in encrypted order 140 by transmitter 158 for transmission. In this case, the value of each of the encrypted bit positions 148 is placed on a corresponding one of parallel wires 108 for transmission. In cases where transmitter 158 is used to transmit encrypted data 116 serially, such as via serial wire 110 or wireless transmission media 112, encrypted data 116 may be stored in shift register 166 for transmission. In this case, encrypted data 116, including encrypted bits 142 in encrypted order 140, is loaded in parallel into shift register 166. Encrypted bits 142 are then shifted out of shift register 166 in encrypted order 140 for serial transmission by transmitter 158.

Encrypted data 116 transmitted from first device 102 via transmission media 106 is received by second device 104 at receiver 168. Receiver 168 is implemented in any manner and by using any device or combination of devices appropriate for receiving encrypted data 116 transmitted from first device 102 to second device 104 via one or more transmission media 106.

Encrypted data 116 transmitted from first device 102 to and received at second device 104 is saved as encrypted data 120 on second device 104. Encrypted data 120 may be stored in any appropriate manner on second device 104 or in a manner so as to be accessible by second device 104. For example, encrypted data 120 may be stored in memory provided on, connected to, or otherwise accessible by second device 104 or any component of second device 104. Encrypted data 120 includes a plurality of encrypted bits 170, which may include data bits 172 and control bits 174. Encrypted bits 170 are in encrypted order 176 in encrypted bit positions 178.

In cases where encrypted data 120 is received via serial transmission, encrypted data 120 first may be shifted bit by bit into shift register 180 as each encrypted bit 170 is received in encrypted order 176 by receiver 168. In this manner, the serial bits are re-assembled into parallel bits in encrypted order 176 to form parallel bits that may be decrypted by multiplexer 182.

Encrypted data 120 is transformed into unencrypted data 122 by operation of multiplexer 182. In accordance with an illustrative embodiment, multiplexer 182 operates to order encrypted bits 170 from encrypted order 176 in encrypted data 120 into unencrypted bits 184, including data bits 186 and control bits 188, in unencrypted order 190 in unencrypted bit positions 192, thereby forming unencrypted data 122. Multiplexer 182 is controlled to perform such decryption using key 124, which is a copy of key 118 that was used to encrypt the data. Thus, unencrypted data 122 is a copy of unencrypted data 114 on first device 102, and second device 104 may be said to reform unencrypted data 114 from first device 102 as unencrypted data 122 on second device 104 by ordering encrypted bits 170 in encrypted data 120 received at second device 104 using key 124.

Multiplexer 182 preferably may be implemented in hardware using one or more multiplexer devices in a manner similar to multiplexer 138 in first device 102. Similarly, multiplexer 182 preferably is controlled to provide decryption in the manner described via control signals 194 provided from processor 196. Processor 196 may be implemented in a manner as described above with reference to processor 152 in first device 102.

In accordance with an illustrative embodiment, unencrypted data 122 may be provided from multiplexer 182 for use by second device 104 on device bus 198. Device bus 198 may be a parallel bus including a number of parallel wires corresponding to the number of unencrypted bit positions 192. In this case, each data bit 186 and control bit 188 in unencrypted data 122 is provided on one of the wires of device bus 198 in parallel in unencrypted order 190. Device bus 198 may also include extra wires corresponding to spare bit positions 192 on which neither unencrypted data bits 186 nor unencrypted control bits 188 are provided.

The illustration of FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in FIG. 1 first device 102 is presented as a transmitting device for transmitting data encrypted in accordance with an illustrative embodiment to second device 104, which is presented as a receiving device for receiving encrypted data from first device 102. In an alternative embodiment, both first device 102 and second device 104 may be both transmitting and receiving devices in which both first device 102 and second device 104 have the appropriate components for encrypting data in accordance with data and control encryption as described herein, transmitting encrypted data, receiving encrypted data, and decrypting received data that has been encrypted in accordance with data and control encryption as described herein.

In the case where first device 102 and second device 104 can communicate in two directions, as both transmitters and receivers, encryption and decryption in each direction may use either the same or different keys. Thus, in accordance with an illustrative embodiment, keys 118 and 124 may include multiple different keys, such as separate different keys used for encrypting data for transmission and for decrypting received encrypted data. Alternatively, seed 164 may include multiple different seeds, such as separate different seeds used for generating keys 118 and 124 for use in transmissions in one direction and for use in generating different keys 118 and 124 for use in transmission in a different direction.

Figure 2:
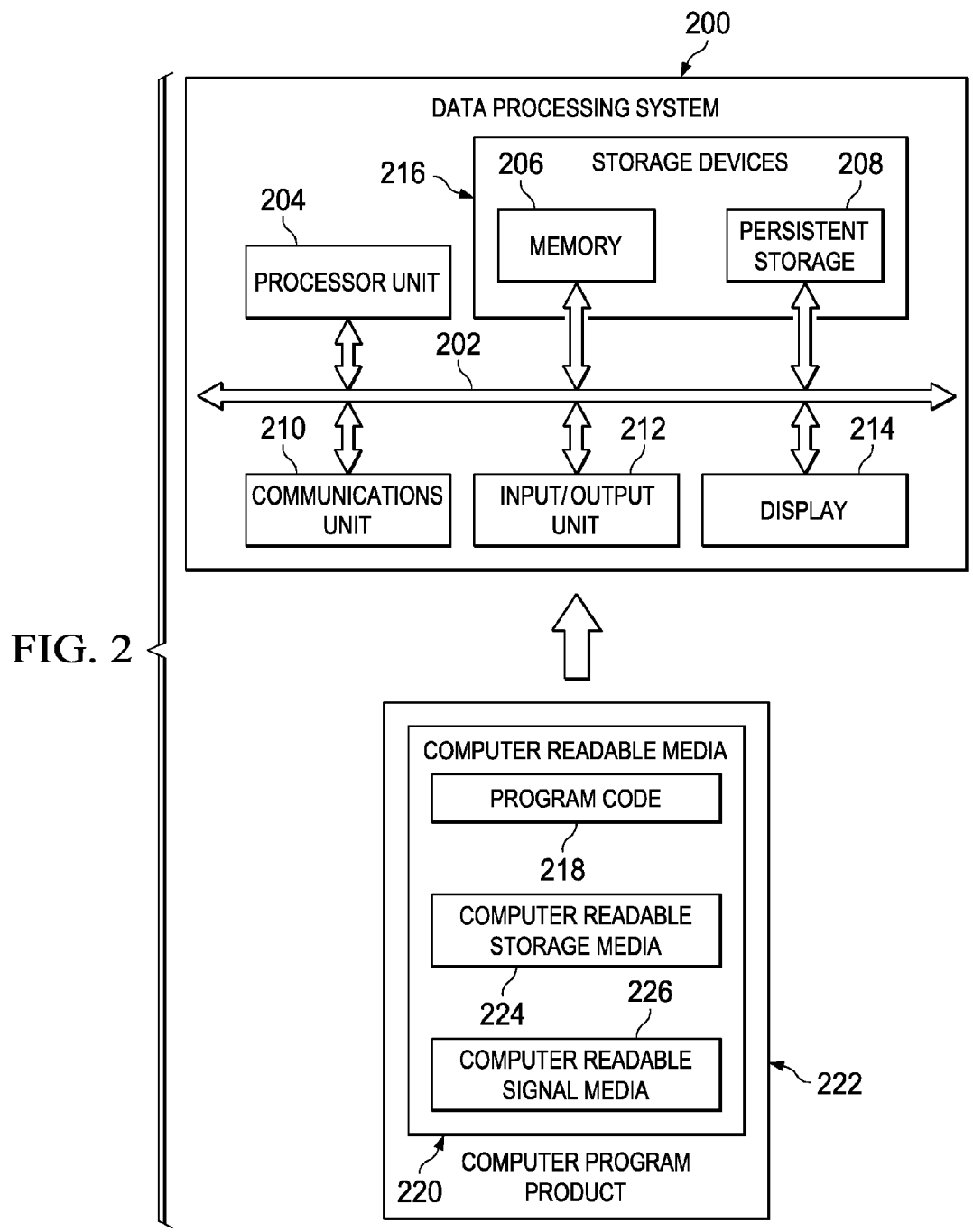
FIG. 2 is a block diagram of a data processing system depicted in accordance with an illustrative embodiment.

Turning now to FIG. 2, an illustration of a data processing system is depicted in accordance with an illustrative embodiment. In this example, data processing system 200 is one example of a possible implementation of first device 102 and/or second device 104 in FIG. 1. In this illustrative example, data processing system 200 includes communications fabric 202, which provides communications between processor unit 204, memory 206, persistent storage 208, communications unit 210, input/output (I/O) unit 212, and display 214. In this example, communications fabric 202 is one example of a possible implementation of one or more of bus 107, device bus 136, and device bus 198 in FIG. 1.

In this example, processor unit 204 is an example of processor 152 and/or processor 196 in FIG. 1. Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links. In this example, communications unit 210 may provide communications via one or more of transmission media 106 in FIG. 1.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be tangible computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium. Computer readable storage media 224 specifically excludes mere propagating signals.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

Figure 3:
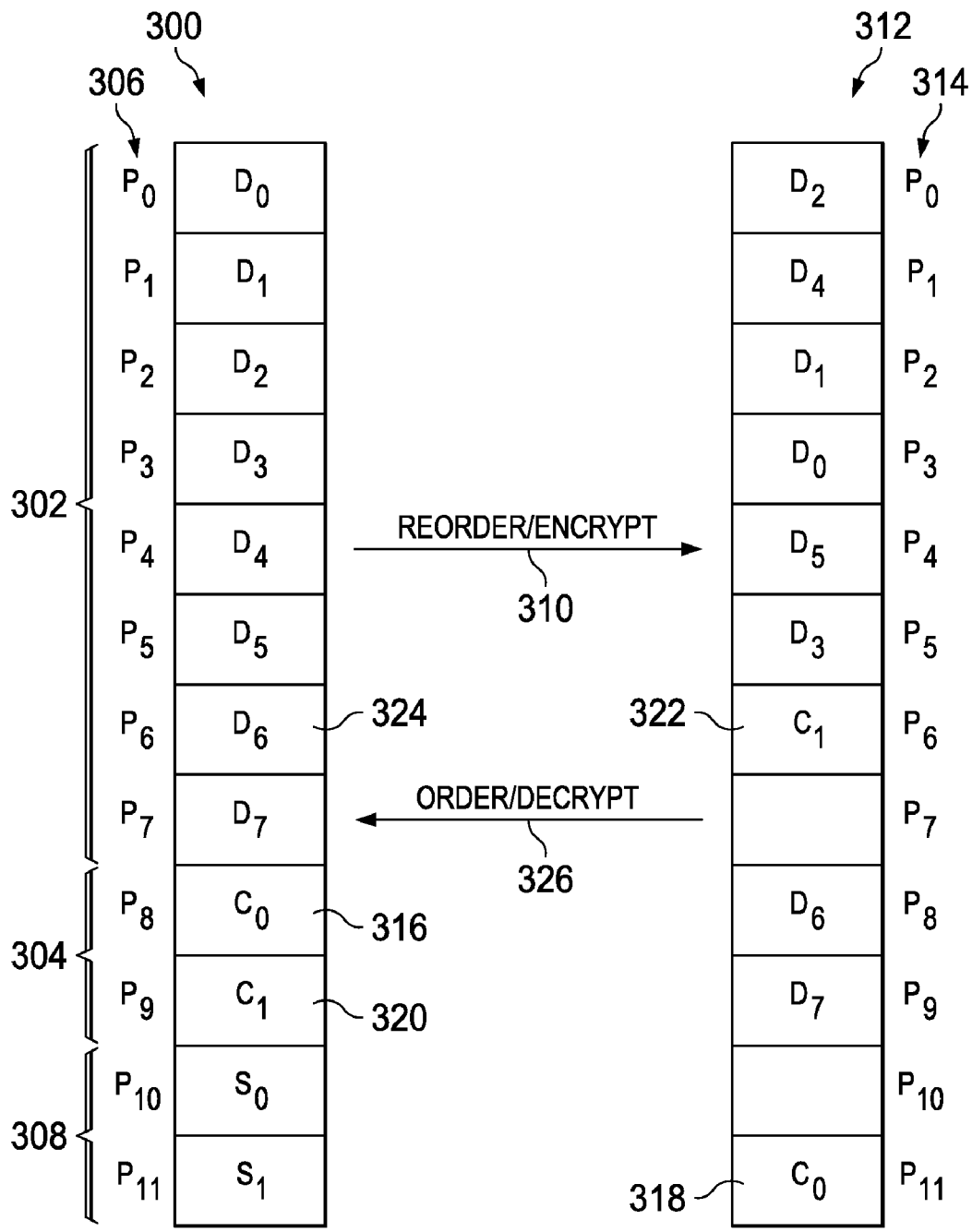
FIG. 3 illustrates an example of data and control encryption in accordance with an illustrative embodiment.

An example of encryption and decryption in accordance with an illustrative embodiment is illustrated in FIG. 3. FIG. 3 shows, for example, unencrypted data 300. Unencrypted data 300 is an example of one implementation of unencrypted data 114 in FIG. 1. In this example, unencrypted data 300 includes eight unencrypted data bits 302, and two unencrypted control bits 304. The ten bits thus forming unencrypted data 300 are ordered in an unencrypted order in twelve available positions 306, wherein unencrypted data bits 302 are followed by control bits 304. In this example there are two extra or spare bit positions 308. Spare bit positions 308 may correspond, for example, to spare wires on a bus that are not usually used for data transmission but that are tested to perform properly when needed. In accordance with an illustrative embodiment, such spare bits may be used and included in the reordering of unencrypted data 300 in accordance with an illustrative embodiment. It should be understood that encryption and decryption in accordance with an illustrative embodiment may be performed with respect to data that includes more or fewer data bits, control bits, spare bits, and bit position than those illustrated by example in FIG. 3.

In accordance with an illustrative embodiment, unencrypted data 300 is encrypted 310 to form encrypted data 312. Encrypted data 312 is an example of one implementation of encrypted data 116 in FIG. 1. In accordance with an illustrative embodiment, encryption 310 includes reordering unencrypted data bits 302 and unencrypted control bits 304 among twelve available positions 314 to form encrypted data 312. As illustrated, as a result of reordering, one of control bits 316 in unencrypted data 300 is moved into position 318 in encrypted data 312 corresponding to one of spare bit positions 308 in unencrypted data 300. Another one of control bits 320 in unencrypted data 300 is moved into a position 322 in encrypted data 312 that corresponds to the position of data bit 324 in unencrypted data 300. Data bit 324 is moved into another position in encrypted data 312. Thus, data and control encryption in accordance with an illustrative embodiment provides for encryption of both data and control bits as various data and control bits are jumbled by reordering both the data and control bits forming unencrypted data 300.

In accordance with an illustrative embodiment, unencrypted data 300 is transformed into encrypted data 312 using a key. The key defines the mapping from the order of unencrypted data 300 to the order of encrypted data 312. Thus, the key is also used to order 326 encrypted data 312 back into the unencrypted order, thereby to decrypt 326 encrypted data 312 to reform unencrypted data 300. Decryption 326 typically is performed by a receiving device after encrypted data 312 is transmitted from a device performing encryption 310 to the receiving device.

Figure 4:
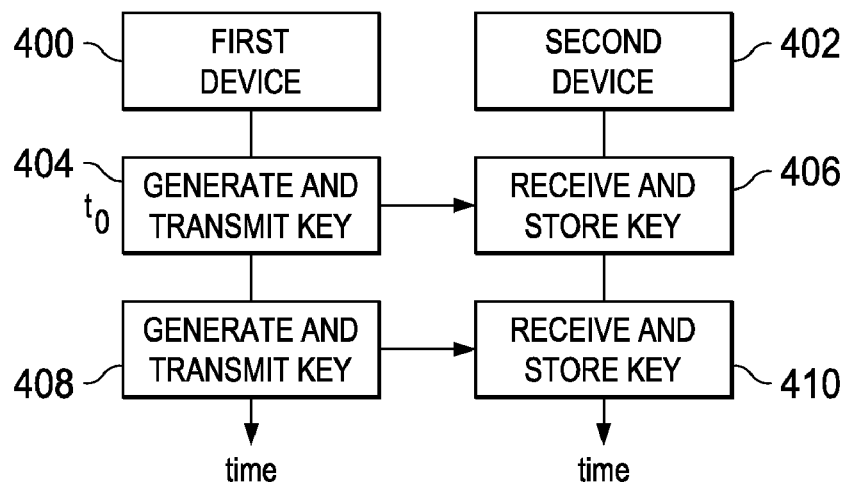
FIG. 4 is a timing diagram illustrating generation and distribution of encryption keys for data and control encryption in accordance with an illustrative embodiment.

Encryption and decryption in accordance with an illustrative embodiment requires that a transmitting device and a receiving device each hold the same key at the same time. FIG. 4 is a timing diagram illustrating a first example of generation and distribution of encryption keys for data and control encryption in accordance with an illustrative embodiment. FIG. 4 is an example of one implementation of the generation and distribution of encryption keys between first device 102 and second device 104 in FIG. 1. In this example, at initialization of communication between first device 400 and second device 402, at time $t_0$, first device 400 generates and transmits a key to second device 402 at 404. By necessity, the first key transmitted to second device 402 at initialization may not be encrypted. Second device 402 receives and stores the key at 406. First device 400 and second device 402 may now use the transmitted and received key for data encryption and decryption in accordance with an illustrative embodiment.

First device 400 may generate and transmit a new key at 408 a period of time after the first key is generated and transmitted. This new key is received and stored by second device 402 at 410. New keys may thus be generated and transmitted from first device 400 to second device 402 periodically. The new key, and subsequent new keys, may be encrypted for transmission using the key in effect at the time of transmission.

Figure 5:
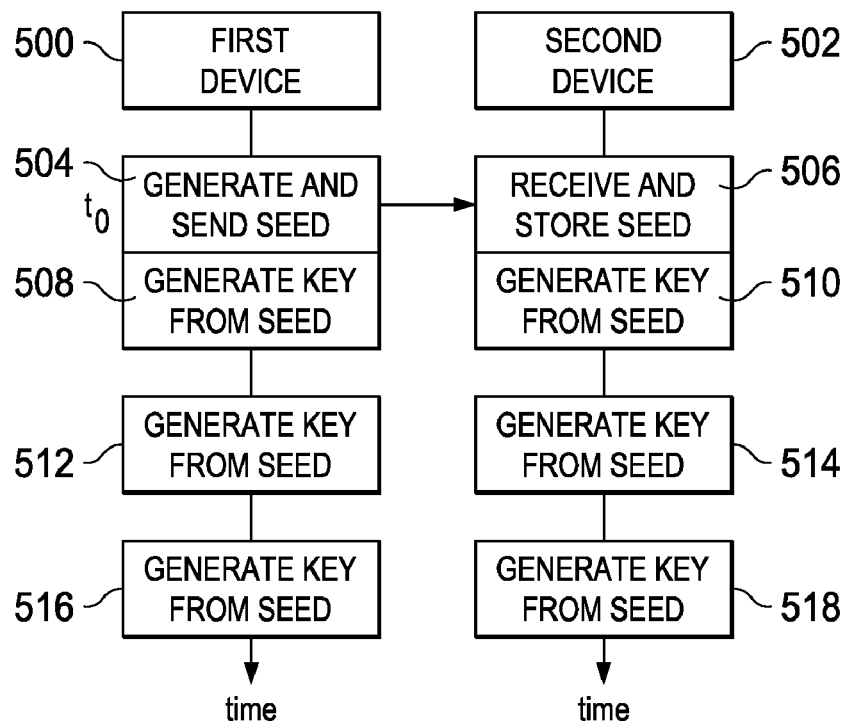
FIG. 5 is a timing and control diagram illustrating generation and distribution of encryption keys for data and control encryption in accordance with another illustrative embodiment.

FIG. 5 is a timing diagram illustrating another example of generation and distribution of encryption keys for data and control encryption in accordance with an illustrative embodiment. FIG. 5 is another example of one implementation of the generation and distribution of encryption keys between first device 102 and second device 104 in FIG. 1. In this example, at initialization of communication between first device 500 and second device 502, at time $t_0$, first device 500 generates and sends a seed for a random pattern generator at 504. The seed is received and stored at 506 by second device 502. The seed is used by first device 500 to generate a key at 508 and by second device 502 to generate a key at 510. The same seed is used for identical random pattern generators in both first device 500 and second device 502, resulting in the generation of identical keys by each device 500 and 502. Periodically, first device 500 will generate a new key from the seed at 512 and 516. Simultaneously, second device will independently generate the same key from the seed at 514 and 518.

Figure 6:
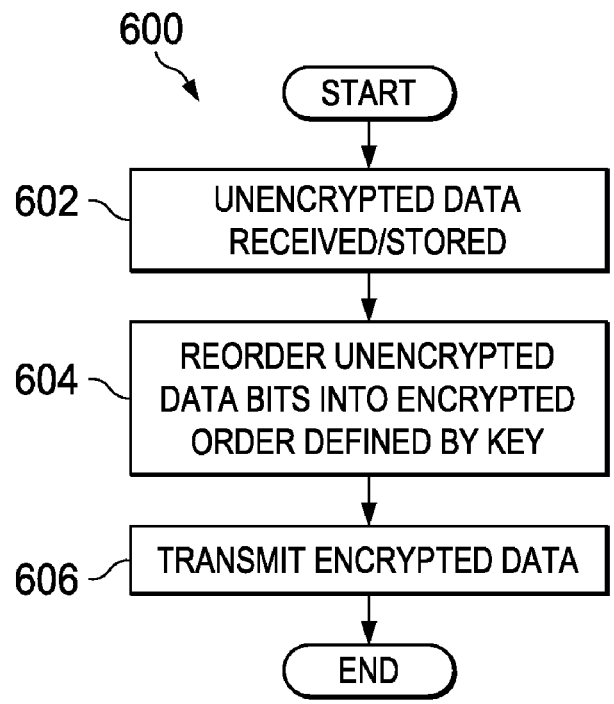
FIG. 6 is a flowchart of a method of data and control encryption in accordance with an illustrative embodiment.

FIG. 6 is a flowchart of a method of data and control encryption in accordance with an illustrative embodiment. In accordance with an illustrative embodiment, in one implementation the method of FIG. 6 may be implemented in data processing environment 100 in FIG. 1.

Method 600 begins with unencrypted data that is received and/or stored on a first device (step 602). In accordance with an illustrative embodiment, the unencrypted data on the first device is encrypted by reordering the unencrypted data bits into an encrypted order defined by a key (step 604). The encrypted data may then be transmitted securely from the first device to a second device (step 606).

Figure 7:
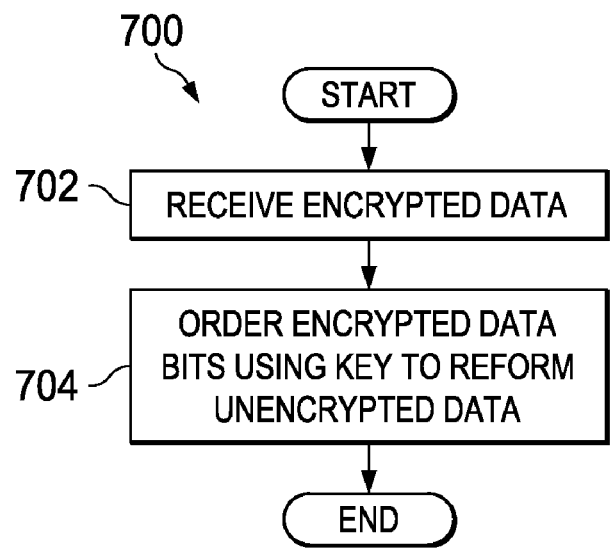
FIG. 7 is a flowchart of a method of data and control decryption in accordance with an illustrative embodiment.

FIG. 7 is a flowchart of a method of data and control decryption in accordance with an illustrative embodiment. In accordance with an illustrative embodiment, in one implementation the method of FIG. 7 may be implemented in data processing environment 100 in FIG. 1.

Method 700 begins by receiving at a device encrypted data that has been encrypted using a key in the manner described above (step 702). The received encrypted data is decrypted by using the key to order the encrypted data bits to reform the unencrypted data (step 704).

One or more of the illustrative embodiments thus provides a capability to encrypt data for transmission by reordering bit values of data and control bits provided on the lines of a parallel bus such that the data and control bit values are jumbled to form encrypted data. The security of such encrypted data is improved, because both data and control information, not just data information, is encrypted when the data and control bit values are reordered. Encryption and decryption in accordance with an illustrative embodiment may be implemented quickly and efficiently using hardware multiplexers to reorder and jumble the unencrypted bits to form encrypted data and to order the encrypted bits to restore the unencrypted bit order on the lines of a parallel bus of a receiving device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with any system, apparatus, or device for running a program. A computer readable storage medium specifically excludes mere propagating signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with any system, apparatus, or device for running a program.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the illustrative embodiments provided herein has been presented for purposes of illustration and explanation, but is not intended to be exhaustive or to limit the invention to the form disclosed. Many modifications and variations will be apparent to those of ordinary skill in the art without departing from the scope and spirit of the invention. The illustrative embodiments were chosen and described in order to best explain the principles of the invention and the practical application, and to enable others of ordinary skill in the art to understand the invention for various embodiments with various modifications as are suited to the particular use contemplated.

What is claimed is:

1. A method of encryption, comprising:
   receiving on a device bus of a first device unencrypted data including a plurality of unencrypted bits, wherein the device bus of the first device includes a first plurality of wires defining a plurality of unencrypted bit positions, and wherein each of the unencrypted bits is provided on one of the first plurality of wires in parallel in an unencrypted order;
   reordering, by the first device, the unencrypted bits provided on the device bus of the first device to form encrypted data, wherein the encrypted data includes a plurality of encrypted bits in parallel in an encrypted order defined by a key, wherein the key defines a random encryption pattern;
   transmitting the encrypted data to a second device; and
   providing a seed at the first device and at the second device and using the seed at the first device and at the second device to generate the key at the first device and at the second device.

2. The method of claim 1 further comprising:
   receiving at the second device the encrypted data; and
   ordering at the second device the encrypted bits using the key to reform the unencrypted data on a device bus of the second device by restoring the order of the encrypted bits to the unencrypted order of the unencrypted bits, wherein the device bus of the second device includes a second plurality of wires, and wherein each of the unencrypted bits is provided on one of the second plurality of wires.

3. The method of claim 1 further comprising:
   periodically providing a new key to the first device and to the second device.

4. The method of claim 1, wherein the unencrypted data includes data bits and control bits, and wherein reordering the unencrypted bits comprises:
   placing at least one control bit into a position of a data bit in the unencrypted order to form the encrypted data.

5. The method of claim 1, wherein reordering the unencrypted bits comprises:
   for each unencrypted bit, placing the unencrypted bit in a position in the encrypted order selected from a subset of all positions in the encrypted order.

6. The method of claim 1, wherein reordering the unencrypted bits comprises:
   reordering the unencrypted bits among a number of positions in the encrypted order that is large than a number of unencrypted bits.

7. The method of claim 1, wherein transmitting the encrypted data comprises:
   transmitting the encrypted bits via a transmission method selected from a group of transmission methods consisting of transmitting the encrypted bits in parallel on a plurality of wires, transmitting the encrypted bits in series on a single wire, and transmitting the encrypted bits wirelessly.

8. A device, comprising:
   a device bus including a plurality of wires defining a plurality of unencrypted bit positions;
   a multiplexer coupled to the device bus and adapted to reorder a plurality of unencrypted bits in unencrypted data on the device bus to form encrypted data including a plurality of encrypted bits in parallel in an encrypted order defined by a key, wherein each of the unencrypted bits is provided on one of the plurality of wires in parallel in an unencrypted order, and wherein the key defines a random encryption pattern; and
   a transmitter adapted to transmit the encrypted data to a second device, wherein a seed is provided at the device and at the second device, and wherein the seed is used at the device and at the second device to generate the key at the device and at the second device.

9. The device of claim 8, further comprising a receiver adapted to receive encrypted data including a plurality of encrypted bits in an encrypted order defined by the key and a multiplexer adapted to order the encrypted bits using the key to reform unencrypted data including a plurality of unencrypted bits in an unencrypted order.

10. The device of claim 8, further comprising:
    a random pattern generator adapted to generate the key using the seed.

11. The device of claim 8, wherein the unencrypted data includes data bits and control bits, and wherein the multiplexer is adapted to reorder the unencrypted bits by placing at least one control bit into a position of a data bit in the unencrypted order to form the encrypted data.

12. The device of claim 8, wherein the multiplexer is adapted to reorder the unencrypted bits by positioning each unencrypted bit in a position in the encrypted order selected from a subset of all positions in the encrypted order.

13. The device of claim 8, wherein the multiplexer is adapted to reorder the unencrypted bits among a number of positions in the encrypted order that is larger than a number of unencrypted bits.

14. The device of claim 8, wherein the transmitter is adapted to transmit the encrypted bits via a transmission medium selected from a group of transmission media consisting of a plurality of wires carrying the encrypted bits in parallel, a single wire carrying the encrypted bits in series, and a wireless transmission medium.

15. A computer program product comprising a computer readable storage device having stored thereon computer program instructions for controlling a data processing system, comprising:
   computer program instructions stored on the computer readable storage device for controlling the data processing system to generate control signals to reorder a plurality of unencrypted bits provided in parallel in an unencrypted order forming unencrypted data using a key to form encrypted data including a plurality of encrypted bits in parallel in an encrypted order defined by the key, wherein the key defines a random encryption pattern; and
   computer program instructions stored on the computer readable storage device for controlling the data processing system to control transmission of the encrypted data to a second data processing system, wherein a seed is provided at the data processing system and at the second data processing system, and wherein the seed is used at the data processing system and at the second data processing system to generate the key at the data processing system and at the second data processing system.

16. The computer program product of claim 15, further comprising:
   computer program instructions stored on the computer readable storage device for controlling the data processing system to generate control signals using the key to order encrypted data including a plurality of encrypted bits in parallel in an encrypted order defined by the key to reform unencrypted data including a plurality of unencrypted bits in parallel in an unencrypted order.

17. The computer program product of claim 15, further comprising:
   computer program instructions stored on the computer readable storage device for controlling the data processing system to generate the key using the seed.

18. The computer program product of claim 15, wherein the unencrypted data includes data bits and control bits in parallel, and wherein the computer program instructions stored on the computer readable storage device comprise computer program instructions for controlling the data processing system to generate control signals using the key to reorder the unencrypted bits by placing at least one control bit into a position of a data bit in the unencrypted order to form the encrypted data.

* * * * *